July 24, 1951  L. HILLMAN  2,561,372
ELECTRICAL RECORDER
Filed Sept. 6, 1944
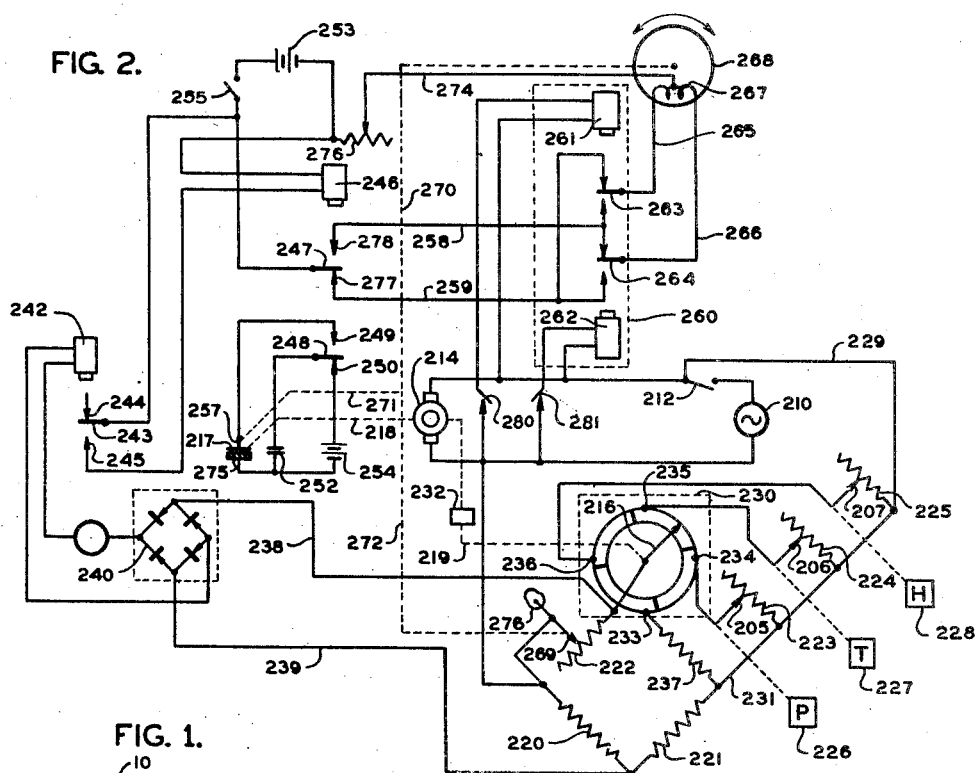
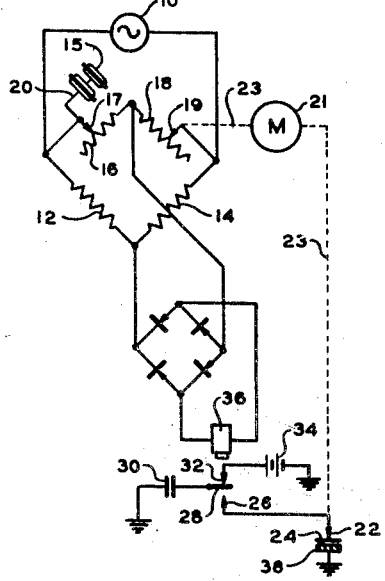
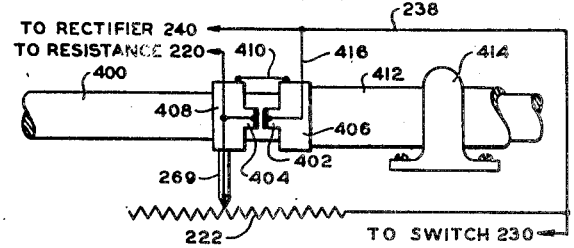
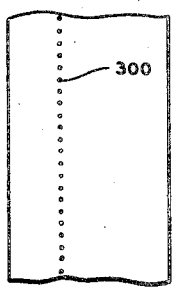
INVENTOR.
LEON HILLMAN
BY William D. Hall
ATTORNEY Patented July 24, 1951

2,561,372

UNITED STATES PATENT OFFICE 2,561,372

ELECTRICAL RECORDER

Leon Hillman, New York, N. Y., assignor to the United States of America as represented by the Secretary of War Application September 6, 1944, Serial No. 552,855

5 Claims. (Cl. 346—32)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a telemetering system responsive to variations in the settings of resistance elements actuated by any desired actuating means.

More specifically the invention relates to an electrical recorder the recordings of which are controlled by the settings of the resistance elements. The recorder will be illustrated in connection with meteorological instruments, but it will be obvious to those skilled in the art that it may be used in connection with any other type of instruments.

In the field of recording readings of meteorological instruments numerous occasions arise when it is desirable to locate the pressure, temperature, and humidity responsive elements in one place and the meteorological data recording tape in another place, the degree of separation being such that electrical transmission of the meteorological data to the recording tape is feasible only by resorting to some suitable telemetering system. The invention discloses such system, which makes it possible to separate the meteorological instruments from the recording tape to any practicably feasible extent.

A simplified principle of operation of the system may be summarized as follows: the recording tape is driven at a uniform rate by means of a synchronous motor, this motor being also used for connecting, in rotation, several meteorological instruments, one instrument at a time, to the telemetering system. This provision for connecting the system to several instruments is incorporated in order to increase its usefulness. The connection between the meteorological instruments and the telemetering system is accomplished by connecting the moving arms of the instruments to respective rheostat arms, the instrument arms varying the settings of the rheostat arms. Each rheotat, when connected to the recorder, comprises one leg of a Wheatstone bridge. The bridge consists of two fixed resistances and two variable resistances, one of the variable resistances comprising the previously mentioned rheostat while the other resistance comprises a balance searching rheostat. The Wheatstone bridge de-energizes a relay when it reaches a balanced condition which results in a discharge of a condenser through the sensitized tape, the position of the discharge on the tape being determined by the position of a stylus which is oscillated from one edge of the tape to the other in synchronism with the oscillations of the balance searching arm of the balance searching rheostat.

It is, therefore, the principal object of this invention to provide an electrical recorder which is capable of recording the readings of a plurality of instruments by discharging a condenser across a sensitized tape.

A more specific object of this invention is to provide an electrical recorder for meteorological instruments the actuating arms of which are connected to the respective rheostats, these rheostats constituting one leg of a Wheatstone bridge while the other leg of the Wheatstone bridge comprises a balance seeking rheostat arm which is oscillated back and forth on the rheostat until it balances the rheostat connected to the meteorological instruments, the balance of the Wheatstone bridge producing a discharge of a condenser across a sensitized tape thus recording the exact reading of any given instrument on the tape.

An additional object of this invention is to provide circuits which make the balance seeking arm to oscillate around the point of balance so that the spacing between the recording dots on the recording tape are close to each other.

Still another object of this invention is to provide electro-mechanical means which make it possible to discharge the condenser, producing the desired record on the tape, only when the balance seeking arm travels in one, preselected direction.

The novel features which I believe to be characteristic of my invention are set forth with particularity in the appended claims; my invention itself, however, both as to its organization and method of operation, together with the further objects and advantages thereof, may best be understood by reference to the following description in connection with the accompanying drawings in which:

Figure 1 is a simplified schematic diagram of the recorder which is used for the sole purpose of aiding to understand some of the principles of the invention.

Figure 2 is a complete schematic diagram of the recorder.

Figure 3 is a portion of a recording tape with a typical record illustrated on the tape.

Figure 4 is a mechanical switch which makes it possible to discharge the recording condenser, only when the balance seeking arm travels in one preselected direction, such as from right to left.

Referring to Fig. 1, which illustrates a simplified schematic diagram of the invention, a source of alternating current potential 10 is connected across a Wheatstone bridge including two fixed resistances 12, 14 and two rheostats 16 and 18. The rheostat arm 17 is connected to a meteorological instrument 15 and its setting is determined by the physical state of the instrument and the position of the lever arms and linkages 20 interconnecting instrument 15 with the arm 17. Since the operation of the entire system is based upon matching the values of the resistances 16 and 18, the rheostat arm 19 is oscillated continously to its right and left positions by a reversible motor 21. The same motor is used for oscillating a recording stylus 22 across a recording tape 24, the arms 19 and 22 being oscillated in synchronism by the same motor 21 and motor shaft 23. Stylus 22 is connected to a contact 26 of an armature 28, the armature being connected to a grounded condenser 30. Contact 32 of armature 28 is connected to a grounded source of direct current potential 34. Unbalanced condition of the Wheatstone bridge normally keeps a relay 36 energized, and armature 28 on contact 32 so that condenser 30 is fully charged. When the Wheatstone bridge becomes balanced, armature 28 becomes deenergized and contact 26 closed thus discharging condenser 30 over stylus 22, the sensitized tape 24 and a grounded metal plate 38, the discharge producing the desired marking on the tape. Since the transverse position of the stylus arm 22 continuously corresponds to the position of the rheostat arm 19 on the balancing resistance 18, it follows that the discharge of the condenser will take place at that instant when rheostat 18 will balance the Wheatstone bridge circuit. This obviously corresponds to the reading of the instrument 15.

Proceeding now with a more detailed description of the recorder, the working schematic diagram of which is illustrated in Fig. 2, the recorder is connected to an A. C. source of potential 210, and a switch 212. A synchronous motor 214 is connected across the A. C. source, this motor being used for rotating a commutator arm 216 and for feeding a recording paper 217, the mechanical connection being illustrated by dotted lines 218 and 219, a reduction gear 232 being interposed in connection 219. The A. C. source of potential is also connected across a Wheatstone bridge, this bridge consisting of two fixed resistances 220, 221, a balance searching rheostat 222 and rheostats 223, 224 and 225, the adjustable arms 205, 206 and 207 of the rheostats being connected by means of mechanical linkages, illustrated diagrammatically by the dotted lines, to meteorological instruments 226, 227 and 228, such as pressure, temperature, and humidity units. The rheostat arms are connected to a commutator switch 230, while the resistances are connected by means of a common conductor 231 to that corner of the Wheatstone bridge which is connected to the A. C. source of potential over a conductor 229. The commutator switch consists of a rotating arm 216 connected to a shaft 219 of the synchronous motor 214 through a reduction gear 232, and four conductive segments 233, 234, 235 and 236. Segment 233 is connected to a fixed resistance 237, this resistance being used for indicating the angular position of the commutator arm 216 in terms of a fixed position line on tape 217. Since the direction of rotation of the commutator arm 216 is known, the operator may at once determine the position of the respective instrument recordings on the tape by referring to this fixed line and examining the positions of the records with respect to the fixed line. If the rotation of arm 216 is clockwise, the fixed line record is followed by the record of the humidity element 228, temperature element 227, and the pressure element 226. As the recording paper and commutator move in synchronism with each other, a given length of recording paper corresponds to the time interval that each segment is connected in circuit with the Wheatstone bridge. Also, as the bridge must regain balance each time a different segment is connected, discontinuity in the record will distinguish the various parameters from each other. The Wheatstone bridge arms 222, 237, 223, 224 and 225 all have relatively high resistance as compared to the arms 220 and 221 so that the bridge is quite responsive to any minor lateral displacement of the rheostat arms. The following values were found to be suitable in one specific application:

Resistances 220 and 221—250 ohms each,
Fixed resistance 237—500 ohms,
Rheostats 222, 223, 224 and 225—3000 ohms each.

The output of the bridge is connected by means of conductors 238 and 239 to a full wave rectifier 240, and the latter is connected to the winding of a direct current relay 242 which is equipped with an armature 243, and contacts 244 and 245. Relay 242 is a sensitive, high resistance winding, relay which is capable of responding to small currents. Relay 242, together with an auxiliary relay 246, determine the instant when the instrument readings are recorded on the tape, the positions of the armatures 243 and 248 being used for connecting a condenser 252 to a stylus 257. To accomplish this result armature 243 and contact 245 are connected to the winding of an auxiliary relay 246 which is connected to a source of direct current potential 253. As illustrated in the diagram, armature 243 is connected to contact 244 as long as relay 242 is energized, and as a result relay 246 is deenergized as long as the Wheatstone bridge remains in an unbalanced condition. When the Wheatstone bridge attains the balanced condition, relay 242 is deenergized and armature 243 drops down to contact 245 thus closing the circuit of relay 246. Relay 246 is provided with two armatures 247, 248, armature 247 being connected to the D. C. source of potential 253 and its contacts 277 and 278 are connected over conductors 258, 259 to the contacts of a latch relay 260 which is provided with two windings 261 and 262. Armatures 263 and 264 of the latch relay are connected over conductors 265 and 266 to a field winding 267 of a reversible direct current motor 268. The shaft of this motor is connected to stylus 257 and arm 269 of the balance seeking rheostat 222, this mechanical connection being indicated on the diagram by means of the dotted lines 270, 271 and 272. The centrally tapped field winding 267 is connected over a conductor 274 and a rheostat 276 to the opposite pole of the D. C. source 253. Depending upon the positions of the armatures 247, 263 and 264 either the upper or the lower half of the field winding 267 is connected to the D. C. source 253. This reversal of the connections reverses the direction of rotation of the reversible motor 268. Because shaft 270 of this reversible motor is connected to stylus 257 and the rheostat arm 269, the two are synchronized, a transverse position of the stylus 257 on the recording tape 217 always corresponding to some predetermined position of arm 269 on rheostat 222. Relay 242 is energized as long as the balance seeking arm 269 is not at the point of balance. Accordingly relay 246 is de-energized, and its armatures 247 and 248 rest on their lower contacts thus connecting the positive terminal of the D. C. source 253 to conductor 259 through armature 247, and condenser 252 to the positive source of potential 254 through armature 248 and contact 249. The latter connection enables condenser 252 to be fully charged from the D. C. source 254, while the former connection produces the rotation of the D. C. motor 268 either in one direction or the other, depending upon the position of the armatures 263 and 264.

When the balance searching arm 269 reaches that point on resistance 222 which produces the balanced condition in the Wheatstone bridge, relay 242 becomes de-energized, armature 243 drops down to contact 245 thus energizing relay 246. Energization of relay 246 transfers armature 248 to the upper contact 249 thus connecting the fully charged condenser 252 to stylus 257 on one side, and to a metal plate 275 on the other side, the recording tape 217 being interposed between the metal plate and the stylus. The potential across condenser 252 is such that it punctures tape 217 thus producing a dot on the recording tape which identifies the transverse position of stylus 257 on tape 217 at the instant of the discharge of the condenser. Tape 217 may be such known chemically treated current sensitive tape as "Teledeltos," manufactured by Western Union Telegraph Company.

The recorded dots indicate telemetrically the position of the balance searching arm 269 when the Wheatstone bridge becomes balanced. Since the balanced condition of the bridge is attained only when the active portion of resistance 222 matches the active portion of one of the resistances 223, 224, 225 or 237, it follows that there will be a telemetric indication on the recording tape of the positions of the arms 205, 206 and 207 on the respective resistances, these arms being connected, as it may be recalled, to the meteorological instruments. Because of the prior calibration of the entire apparatus, it thus becomes possible to record on tape 217 the actual readings of the meteorological instruments.

The function performed by the latch relay 260 is to reverse the direction of rotation of the direct current motor 268 when the potentiometer arm 269 reaches its extreme left or right positions on the slide-wire resistance 222. This is accomplished by means of a cam 276 connected to the balance searching arm 269, and contacts 280, 281 which are either closed or opened by cam 276. When D. C. motor 268 moves arm 269 from right to left, the arm will eventually come to that position on resistance wire 222 when cam 276 will close contact 280 thus energizing winding 261. Energization of the latter results in the transfer of the armatures 263 and 264 of the relay to their upper contacts thus disconnecting the right portion of field winding 267 and connecting the left portion of the same winding to the source 253, should armature 247 of relay 246 be on its lower contact at this instant. This reverses the direction of rotation of motor 268, and the latter reverses the movement of arm 269, and of stylus 257, these elements, upon reaching their extreme left position, are now being moved by the reversible motor in the opposite direction. The functioning of contact 281 is identical in all respects to the functioning of contact 280, contact 281 being closed when the stylus arm 257 and arm 269 reach their extreme right positions. Since relay 260 is a latch relay, the armatures 263 and 264 remain in the position imparted to them by the windings until energization of the other winding transfers their position to the other set of contacts.

In the course of these extreme right and left swings of the stylus 257 and arm 269, the latter will come to some point on resistance 222 which will create a balanced condition in the Wheatstone bridge. As mentioned previously, this results in the transfer of armature 248 from contact 250 to contact 249, and discharge of condenser 252. Simultaneously, armature 247 is transferred at this instant from contact 280 to contact 281 thus reversing the direction of rotation of the direct current motor 268. Accordingly, the reversal of the direction of rotation of motor 268 may be accomplished not only by means of the contacts 280 and 281, but also by transferring the position of armature 247. The reason for this type of operation of the direct current motor 268 is as follows: it is desirable to have the record dots on the recording tape 217 as close to each other as possible since such disposition of the dots obviously contributes to the legibility of the record. If one were to rely exclusively on the contacts 280 and 281 it is obvious that large, undesirable spacings would exist between the dots on the tape since it takes a relatively long time for the arm 269 and stylus 257 to travel from one extreme position to the other. In order to avoid this wasteful and useless transverse movements of the stylus 257 and arm 269, relay 246 is provided with armature 247 which, as mentioned previously, reverses the direction of rotation of direct current motor 268 when the Wheatstone bridge reaches its balanced condition. Because of the inertia of the motor, arm 269 and stylus 257 are carried beyond the point of balance of the Wheatstone bridge so that stylus 257 and arm 269, after the first balanced condition of the Wheatstone bridge had taken place, are oscillated only a short distance to the left and to the right of this balanced condition, these short swings enabling one to obtain closely spaced recording dots on tape 217. The record produced under such circumstances is illustrated in Figure 3. It consists of a series of dots 300 which are produced when the balance searching arm 269 travels either from left to right or from right to left, depending upon the fact whether the first discharge of the condenser took place when the arm was moving in one direction or the other. To clarify this, let us assume that the balance seeking arm 269 has been initially moving from left to right, and that when all the switches were closed the Wheatstone bridge was so much out of balance that relay 242 became at once energized. Accordingly, during this initial stage armature 248 rests on contact 250 and condenser 252 is connected to source 254. As arm 269 reaches a balance point, relay 242 de-energizes, relay 246 energizes, armature 248 is transferred to contact 249, and the condenser discharges through the tape while stylus 257 is moving in synchronism with arm 269 from left to right. As mentioned previously, because of the inertia of motor 268, stylus 257 and arm 269 move beyond the point of balance but this movement is of such limited nature that no marked unbalance is attained, and there is no energization of relay 242 during this over-shooting period. The reversal of rotation of motor 268 takes place, and it again moves arm 269 to the point of balance, and beyond the point of balance, arm 269 now travelling from right to left. There is no condenser discharge during this direction of travel. The unbalanced condition of the Wheatstone bridge is now attained very quickly, and relay 242 becomes energized once more which again transfers armature 247 from contact 278 to contact 277 thus again reversing the direction of rotation of motor 268 and again moving arm 269 from left to right. During this last reversal of rotation armature 248 is transferred from contact 249 to contact 250 thus again connecting condenser 252 to the source of potential 254. Accordingly, a state identical to the initial state of the apparatus is obtained once more with the condenser being fully charged, and the arms moving from left to right. When the balanced condition is reached, condenser 252 at once discharges giving a second dot on tape 217. It should be noted that this recording of the balanced condition has been obtained without any assistance of the contacts 277 and 278, the entire reversal of the operation being performed by the armature 247 of relay 246. Because of the sensitive nature of the relays the spacings between the adjacent dots 300 are quite small and the entire system, once it reaches the balanced state, oscillates around the point of balance in a manner described above.

The functioning of the recorder should be apparent from the description that has already been given, and, therefore, only a brief summary of its functional cycle will suffice. The recorder is started by closing the switches 212, 255, closing of switch 212 starting the synchronous motor 214 which drives the recording tape 217 and the distributor arm 216. The segments and arm 216 of distributor 230 are so arranged that arm 216 makes contact with the next segment before it breaks it with the preceding segment. This is done to avoid sudden opening of the bridge circuit, and creation of the unnecessary bridge unbalances. Depending upon the position of the armatures 263, 264, the reversible motor 268 will at once start moving the balance searching arm 269 and stylus 257 along the resistance 222 and the recording tape 217 respectively, the arm 269 endeavoring to find a point of balance of the Wheatstone bridge. Since it is presumed that at the time the recorder has been connected to the sources of potential the Wheatstone bridge happened to be out of balance, the potential appearing across the bridge is impressed on the rectifier 240, which in turn impresses its output relay 242, and as a result armature 243 rests on contact 244. The circuit of relay 246 is, therefore, open, and its armatures 247 and 248 rest on the lower contacts, armature 248 connecting condenser 252 to source 254, which fully charges the condenser. If arm 269 happened to be moving away from the point of balance, at the time the recorder has been energized, cam 276 connected to the arm 269 will eventually engage either contact 277 or contact 278, thus energizing one of the windings of the latch relay 260 which at once transfers the armatures 263 and 264 either to the left or right contacts, thus reversing the direction of rotation of the reversible motor 268. The arm 269 will now move to the point of balance, and when this point is reached relay 242 becomes de-energized, armature 243 dropping to its lower contact 245 thus energizing relay 246. The resulting transfer of armature 248 from contact 250 to contact 249 discharges condenser 252 across the recording tape producing the desired recording mark on the tape. Simultaneous transfer of armature 247 from contact 277 to contact 278 reverses the direction of rotation of motor 268 so that the rheostat arm 269 and the stylus 257 begin to move once more toward the point of balance. Although the transfer of the armatures 248 and 247 to the upper contacts takes place at the time the rheostat arm 269 reaches a point of balance, the inertia of motor 268 moves the potentiometer arm 269 beyond the point of balance but not so much as to energize once more relay 242. The balance arm 269, therefore, will travel toward the point of balance once more by approaching it now from the opposite direction. However no recording of this second balanced condition will appear on the tape since condenser 252 is still connected to the stylus 257 because of the first balanced condition obtained by the rheostat arm 269. The movement of the rheostat arm 269 beyond the point of balance will continue until relay 242 becomes energized once more because of the unbalanced condition obtained at the Wheatstone bridge, and this connects condenser 252 to the source of potential 254, and armature 247 to its lower contact 277, thus reversing the direction of rotation of motor 268. The above type of oscillation of the balance searching arm 269 will continue as long as the arm is connected to one of the meteorological instruments, and after it once reaches the balanced condition.

From the description of the operating cycle given thus far it should be apparent that the contacts 277 and 278 are used only when the balance seeking arm 269 finds itself in an out of balance position on the resistance 222 and the rotation of the direct current motor 268 is such that it moves the arm away from the point of balance. This movement continues until cam 276 closes either contact 277 or 278 so that the rotation of the direct current motor 268 is reversed and arm 269 moves toward the balance point. Once the arm 269 has reached the balanced point it will oscillate around it as described previously.

Such operation of arm 269 however indicates that condenser 252 may become discharged when arm 269 moves either from left to right or from right to left, depending upon the initial condition of the system. As described previously, if the condenser has been discharged for the first time when the balance seeking arm moved from left to right all subsequent discharges will take place when this arm will be again moving from left to right and there is no such operating condition of the system when the record of the dots illustrated in Fig. 3 represents an alternate series of discharges of condenser when the balance seeking arm moves first from left to right and then from right to left. However, there still remains a condition when, for example, the humidity indicator 228 produces continuous condenser discharges when the balance seeking arm moves from left to right and from right to left when connected to the temperature indicator 227. This may happen when the commutator arm 216 moves from the humidity segment to the temperature segment of commutator 230 when the balance seeking arm is to the right of the balance point on the resistance 222 for the temperature indicator 227, and the resulting energization of relay 246 results in the movement of arm 269 away from the balanced condition. Under such conditions, when arm 269 will reach the point of balance on the return stroke, it will be moving from right to left, and condenser 252 will discharge itself at that instant. Since it takes some finite current to hold armature 243 energized, it follows that it will be de-energized not at the instant of absolute balance of the Wheatstone bridge but slightly before this absolute balance has been reached. Accordingly, if the system is allowed to discharge condenser 252 when the balance seeking arm moves either from left to right or right to left, a slight discrepancy in the readings of the instruments will be always present, discrepancy being traceable to the current necessary to hold armature 243 energized. In order to avoid the introduction of this minor error an arrangement illustrated in Fig. 4 may be used, this arrangement making it possible to discharge condenser 252 only when the balance seeking arm 269 moves from left to right.

Referring to Fig. 4, it illustrates arm 269 connected to a shaft 400 which moves it along resistance 222. As in the Fig. 2, resistance 222 is connected to that corner of the Wheatstone bridge which is connected on one side to switch 230 and to rectifier 240 over conductor 238. The only electrical difference that has been introduced in Fig. 4 resides in the contacts 404 and 402 which are capable of shorting the effective portion of resistance 222, the shorting contacts being connected to the shaft collars 406, 408. Collar 408 is solidly mounted on shaft 400 while collar 406 is only in a slight frictional engagement with shaft 400 so that when shaft 400 moves from right to left, it follows the movement of shaft 400 only because of a non-conductive flexible jumper 410 which mechanically and flexibly inter-connects the two collars, jumper 410 dragging collar 406 and sleeve 412 along when shaft 400 moves from right to left. At this instant the contacts 406, 408 are opened so that the resistance arm 222 is included in the circuit of the Wheatstone bridge. Because of this when arm 269 will reach a balanced condition on resistance 222 there will be de-energization of relay 242. Therefore, a recording dot will be produced on tape 217 when shaft 400 moves from right to left. Also the direction of rotation of the D. C. motor 267 will be reversed because of the momentary energization of relay 246. Although the relays 242 and 246 are fast acting relays and de-energization of relay 242, and the resulting energization of relay 246 substantially coincides in terms of time with that instant when the rheostat arm 269 reaches the balanced condition of the Wheatstone bridge, there will be a slight overshooting of this balanced condition because of the inertia of the direct current motor and minor delay introduced by the relays. However, this over-shooting is not so marked as to produce reenergization of relay 242, and, therefore, shaft 400 will travel from left to right until the contacts 402 and 404 close. The spacing between the contacts 402 and 404 is so adjusted that closing of the contacts takes place only after arm 269 passes beyond the balanced point on resistance 222. When upon the first reversal of movement of arm 269 the contacts 402 and 404 close, resistance 222 becomes shorter creating very large unbalance in the Wheatstone bridge. The unbalanced condition of the bridge at once energizes relay 242 and de-energizes relay 246 so that there is once more the reversal of the direction of movement of arm 269 and charging of condenser 252. The arm 269 again moves to its point of balance on the resistance 222 which once more produces de-energization of relay 242 discharge of condenser 252, etc. These short oscillatory movements of the balance searching arm 269 continue as long as the arm is connected to one meteorological instrument, the discharge of condenser 252 taking place only when shaft 400 moves from right to left.

It is obvious that with the arrangement illustrated in Fig. 4 the bridge will remain in an unbalanced condition as long as the arm 269 moves from left to right since the contacts 402, 404 short resistance 222. Accordingly, it is impossible to discharge condenser 252 when arm 269 moves from left to right.

The same results may be obtained by equipping relay 242 with a copper slug thus making this relay a slow release relay. The delay in the time of release may be so adjusted that it will coincide with the absolute balance of the bridge thus completely nullifying the previously mentioned difficulties. It is obvious that the latter arrangement is a simplier one than the one disclosed in Fig. 4, and, therefore, may represent a preferred embodiment of the invention when fairly stable voltage supplies are available.

Another obvious solution of this problem would be to have the armature 248 inter-connected with arm 269 in such a manner that the armature becomes released only when arm 269 goes in a desired direction.

While I have shown and described several preferred forms of the invention, it will be apparent to those skilled in the art that additional modifications are possible although they are not illustrated in any of the drawings. For example, Fig. 2 illustrates three rheostats 223, 224 and 225 and one fixed resistance 237, the latter being used for identifying the position of the readings of the respective meteorological instruments on the recording tape 217. It is obvious that resistance 237 may be eliminated altogether so that only three variable rheostats are used in connection with the Wheatstone bridge. When this is the case, the rheostat arms 205, 206 and 207 are set on their respective resistors so that the respective readings could be identified with a sufficient degree of positiveness on the recording tape.

For example, the following original settings would give sufficiently clear differentiation on the tape:

Rheostat 222 _____ohms____ 2900
Rheostat 223 _____do_____ 2800
Rheostat 224 _____do_____ 2700

The same result may be also accomplished by introducing fixed resistances into these branches of the circuit.

Figure 2 also shows the use of two relays 242 and 246. It is obvious that the functions performed by the two relays may be combined in one relay having sufficient number of contacts for accomplishing the functions of the above mentioned relays. Similarly relay 260 may be eliminated altogether, and replaced by the mechanical contacts which reverse the direction of rotation of motor 268, the actuating cam for the contacts of this kind should be fastened to the balance seeking arm 269, the cam being identical to cam 276. The above mentioned modifications simplify the structure of the recorder even further without affecting its usefulness and reliability of its performance.

An additional possible modification resides in the reduction in the number of power supplies used for operating the recorder. Figure 2 discloses the use of three independent power supplies, the A. C. source 210, and the two D. C. sources 253, 254. It will be obvious to those skilled in the art that the recorder may be operated from one direct current source 254, used for charging condenser 252, which is then also connected to the reversible motor 268 and motor 214, the latter being in this case a D. C. motor.

The invention also discloses the use of resistances in all Wheatstone bridge branches. It is obvious that the resistances may be substituted by the reactances so that the bridge acts as an alternating bridge. The sensitivity of the bridge may be increased by operating it as a tuned alternating current bridge with the meteorological instruments connected to variable condenser or variometers which vary the impedances of the bridge in the desired manner.

It is believed that the construction and operation of the recorder, as well as the advantages thereof, will be apparent from the foregoing description. It should be understood, however, that while I have shown and described my invention in several preferred forms many changes and modifications may be made without departing from the spirit of the invention as sought to be defined in the following claims.

I claim:

1. An electrical recorder including a source of potential, a Wheatstone bridge connected to said source of potential, the legs of said bridge comprising two fixed impedances and first and second variable impedances having first and second bridge arms respectively for varying said impedances, said first bridge arm being connected to an instrument the readings of which are to be recorded, a reversible motor connected to a source of potential, said motor having a shaft connected to said second bridge arm, means for reversing said reversible motor at predetermined limits of said second bridge arm, whereby said reversible motor normally oscillates said second bridge arm between said predetermined limits to balance said first and second impedances, a recording relay connected across said Wheatstone bridge, said recording relay being energized when said bridge is out of balance and de-energized when said bridge is in balance, an auxiliary relay having first and second armatures energized by said recording relay only when said recording relay is de-energized, a condenser, a source of potential for normally charging said condenser when said auxiliary relay is de-energized, a recorder connected across said condenser, said recorder having a stylus connected to the shaft of said reversible motor, whereby said stylus and said second bridge arm are oscillated by said reversible motor in synchronism and in phase with respect to each other, said first armature discharging said condenser through said recorder and said stylus when said Wheatstone bridge is in balance and when said auxiliary relay is energized, and said second armature reversing the direction of rotation of said reversible motor substantially immediately upon obtaining a balanced condition of said bridge, whereby said recording and auxiliary relays and said second armature reverse the direction of rotation of said motor substantially at the instant of each balancing of said bridge, and continuously oscillate said second arm and said stylus in the direct vicinity of said balance after obtaining the first balanced condition of said bridge upon starting of the operation of said recorder.

2. An electrical recorder as defined in claim 1 in which said first variable impedance comprises a plurality of impedances, a corresponding plurality of instruments, the readings of which are to be recorded, connected respectively to said impedances, and means including a motor-driven commutator having at least a corresponding plurality of segments for connecting a single impedance at a time to said bridge.

3. A recorder including a Wheatstone bridge, said bridge including a first variable impedance arm, an instrument connected to and actuating said arm, a second variable impedance arm, a reversible motor mechanically connected to and varying the impedance of said second arm between predetermined maximum and minimum limits of the impedance of said second arm, a motor-driven recording tape, electrical and mechanical instrumentalities including a recording stylus, said stylus being mechanically connected to said reversible motor whereby said reversible motor oscillates said stylus across said tape for recording on said tape the position of said first arm, said instrumentalities including means for making said recording when said stylus is travelling only in one direction across said tape, and additional instrumentalities for limiting the amplitude of the oscillation of said stylus and of said balancing arm around the point of balance of said bridge after obtaining the first balanced condition of said bridge upon starting of the operation of said recorder.

4. An electric recorder as defined in claim 1, further including first and second electric contacts mounted on said second bridge arm, means for electrically connecting said first and second contacts only in response to said second bridge arm traveling in a given direction, and means for short-circuiting said second impedance in response to said first and second contacts being electrically connected.

5. An electric recorder as defined in claim 4, wherein said first electrical contact is rigidly attached to said second bridge arm, said second electrical contact is frictionally engaged with second bridge arm, and wherein said first and second electrical contacts are mechanically connected by a flexible insulated coupling, whereby said first contact engages and pushes said second contact during the travel of said second bridge arm in said given direction, and said first contact disengages and pulls said second contact through said flexible coupling during the travel of said second bridge arm in a direction opposite from said given direction.

LEON HILLMAN.

REFERENCES CITED

The following references are of record in the file of this patent:

UNITED STATES PATENTS

| Number | Name | Date |
|---|---|---|
| 1,641,199 | Roucka | Sept. 6, 1927 |
| 2,321,605 | Keinath | June 15, 1943 |
| 2,400,828 | Keinath | May 21, 1946 |
| 2,428,129 | Smith | Sept. 30, 1947 |